United States Patent [19]

Dullien et al.

[11] 4,067,703
[45] Jan. 10, 1978

[54] GAS SCRUBBER AND METHOD OF OPERATION

[76] Inventors: Francis A. L. Dullien, R.R. No. 1, St. Agatha; Donald R. Spink, 323 Grant Crescent, Waterloo, both of Ontario, Canada

[21] Appl. No.: 530,874

[22] Filed: Dec. 9, 1974

Related U.S. Application Data

[63] Continuation of Ser. No. 354,638, April 26, 1973, abandoned.

[51] Int. Cl.² ............................................. B01D 47/06
[52] U.S. Cl. .......................................... 55/92; 55/238; 55/257 C; 55/400; 261/79 R
[58] Field of Search ................. 55/235, 239, 238, 257, 55/447–451, 400–409, 91, 92; 261/78, 89, 90, 116, 79 R

[56] References Cited

U.S. PATENT DOCUMENTS

| | | | |
|---|---|---|---|
| 831,275 | 9/1906 | Fries | 261/90 |
| 2,195,707 | 1/1938 | Nutting | 55/407 X |
| 2,763,982 | 9/1956 | Dega | 261/116 X |
| 2,858,903 | 11/1958 | Goetz | 55/94 X |
| 2,935,375 | 5/1960 | Boucher | 55/107 X |
| 3,016,979 | 1/1962 | Schmid | 55/235 X |
| 3,406,498 | 10/1968 | Wisting | 261/89 X |
| 3,448,562 | 6/1969 | Wisting | 261/116 X |
| 3,651,622 | 3/1972 | Wisting | 55/404 |
| 3,653,187 | 4/1972 | Peterson | 261/90 X |

*Primary Examiner*—Frank W. Lutter
*Assistant Examiner*—David L. Lacey
*Attorney, Agent, or Firm*—Christel & Bean

[57] ABSTRACT

A method and apparatus for separating particulate matter in solid or liquid form from a gas stream wherein dirty gas enters a conduit at one end and is moved through it by a fan at the other end operating at a low speed. A relatively fine spray of liquid, preferably water, is discharged into the gas stream upstream from the fan. Cleaned air is exhausted from the fan casing, and particulate matter separated from the gas stream is removed and collected through an opening in the fan casing below the clean gas exhaust. The fan preferably is of the centrifugal type, and good efficiency is obtained with a fan speed of about 600 r.p.m. and with a spray wherein the water droplet size is about 10–30 microns.

11 Claims, 6 Drawing Figures

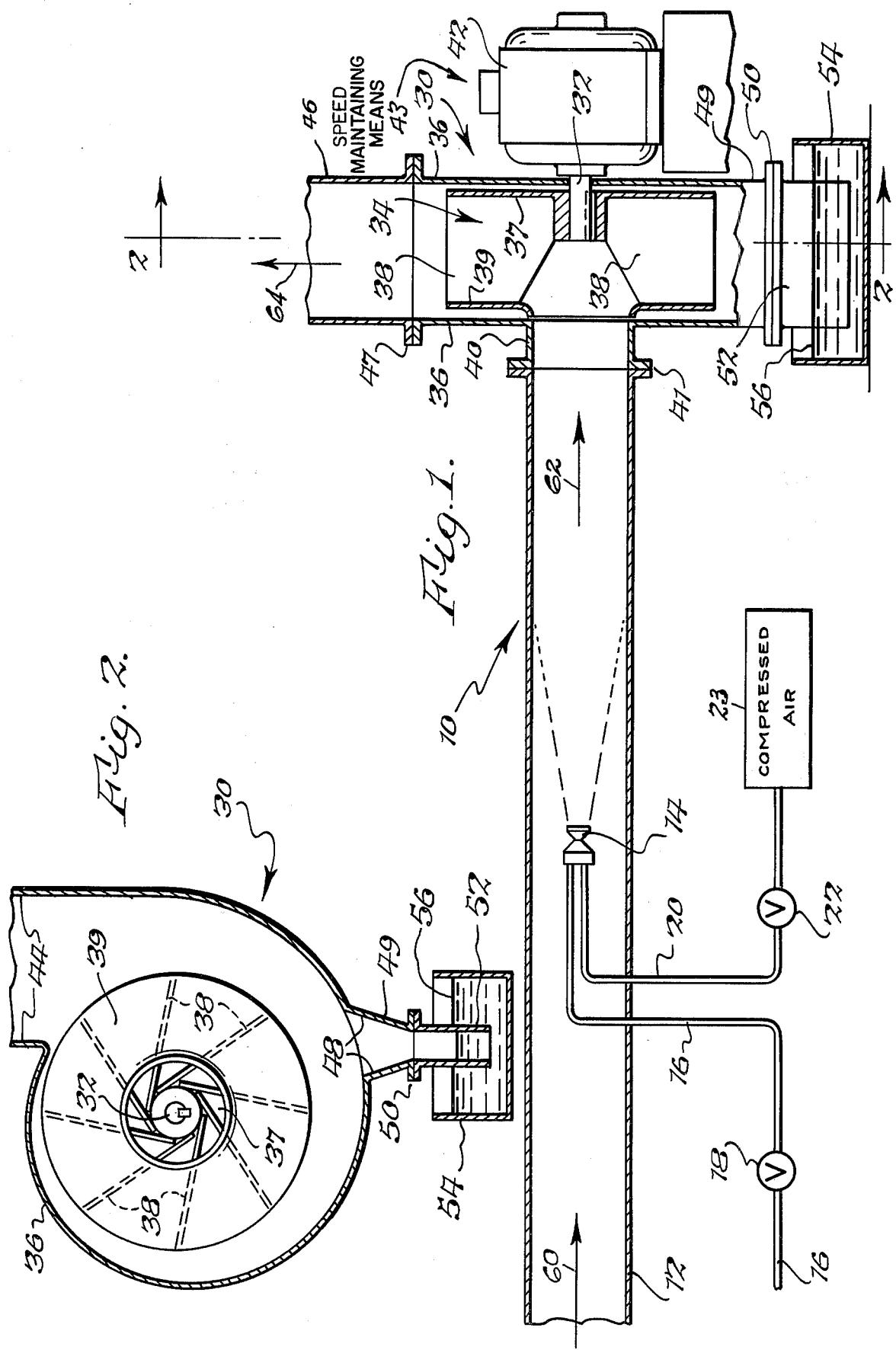

GAS SCRUBBER AND METHOD OF OPERATION

This is a continuation of application Ser. No. 354,638 filed Apr. 26, 1973 now abandoned.

BACKGROUND OF THE INVENTION

This invention relates to the gas scrubbing art, and more particularly to a new and useful method and apparatus for separating particulate matter from a gas stream.

In dust collection methods and apparatus of the wet type, a liquid, generally water, is injected or discharged into the gas stream to enhance the separation of particulate material from the gas. In many wet scrubbers as they are commonly referred to, the efficiency of operation has been observed to decrease rapidly when the size of the particles decreases beyond a certain value. The venturi type wet scrubber is known to be very efficient for separating particles having a size less than one micron, but to obtain this efficiency it must be operated at extremely high pressure drops and therefore has very large energy requirements.

SUMMARY OF THE INVENTION

It is, therefore, a primary object of this invention to provide a new and improved method and apparatus for separating particulate matter from a gas stream.

It is a further object of this invention to provide such a method and apparatus which is effective in removing relatively small size particles.

It is a further object of this invention to provide such a method and apparatus which has relatively low energy requirements so as to provide economical operation.

The present invention provides a method and apparatus for separating particulate matter from a gas stream wherein a relatively fine liquid spray is discharged into a dirty gas stream moving along a conduit having a fan at the downstream end thereof operating at a low speed. The gas and particulate matter are separated in the fan and are removed therefrom. The fan preferably is a centrifugal type fan operated at a speed of from about 1000 r.p.m. to about 300 r.p.m. and the liquid spray droplets have a size from about 10 to about 30 microns and preferably are of water.

The foregoing and additional advantages and characterizing features of the present invention will become apparent upon a reading of the ensuing detailed description together with the included drawing wherein:

BRIEF DESCRIPTION OF THE DRAWING FIGURES

FIG. 1 is a fragmentary elevational view, partly in section, of the apparatus according to the present invention;

FIG. 2 is a sectional view taken about on line 2—2 of FIG. 1;

DETAILED DESCRIPTION OF THE ILLUSTRATED EMBODIMENT

Figure 3:
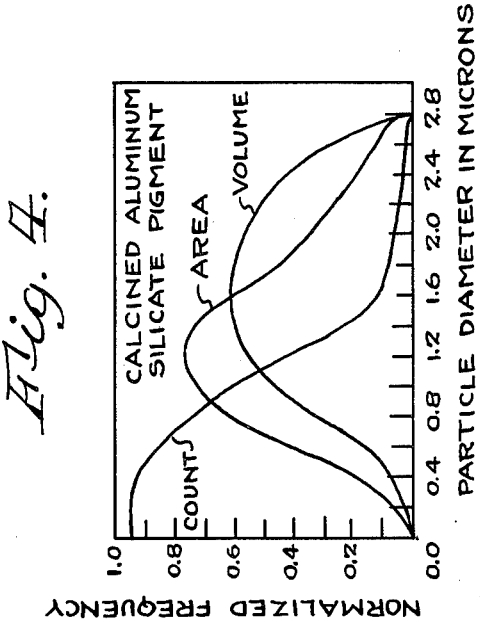
FIGS. 3-5 are graphs or plots of particle size distribution presented on a normalized frequency distribution basis of three types of particulate material used in tests of the method and apparatus of the present invention.

Referring now to FIG. 1, the apparatus of the present invention comprises conduit means in the form of a relatively straight duct 10 having a dirty gas inlet 12 at one end thereof, i.e. at the left-hand end as viewed in FIG. 1. Inlet 12 is connected by suitable means (not shown) to various sources of dirty gas to be cleaned, such as the exhaust or ventilation outlet duct from an industrial facility. The particulate matter removed from the gas stream by the method and apparatus of the present invention can be in solid form such as dust or other solid particles present as contaminants in the air, and the particulate matter also can be in liquid form such as fine mists or aerosols as well as liquid organic material, for example fat droplets. The apparatus further comprises means generally designated 14 for discharging liquid into the gas stream flowing through duct 10. The liquid discharging means 14 provides a relatively fine spray or mist, preferably of water, wherein the liquid droplets range in size from about 10 to about 30 microns in diameter. In preferred form, liquid discharging means 14 comprises a pneumatic nozzle such as a Binks round pattern pneumatic atomizer nozzle series 50, number 100. Water can be supplied to nozzle 14 at the standard line or mains pressure by a conduit designated 16 in FIG. 1 having connected therein a valve 18 to control the rate of flow of water through the nozzle and thus also control the degree of atomization achieved, which can range from a very fine mist to a heavy fog. Air under pressure is supplied to nozzle 14 by a conduit 20 which, for example, can be connected through a valve 22 to a source 23 of air pressure rated at about 125 psi. Valve 22 can be of the EMCO 150 pound steam type providing on-off control. Liquid droplets provided by nozzle 14 range in size from about 5 microns to about 100 microns, with the major portion of the droplets having a size from about 10 to about 30 microns.

The apparatus of the present invention further comprises fan means 30 adjacent the other end of duct 10. In particular, fan 30 is of the centrifugal type and comprises a shaft 32 having a bladed wheel 34 fixed thereto, the shaft and bladed wheel being rotatably positioned or supported in a volute casing 36. In particular, fan wheel 34 comprises a disc-shaped member 37 fixed to shaft 32, a plurality of blade members 38 extending from disc 37 and equally spaced around the shaft 32, and an annular element 39 fixed to the edges of blades 38 and disposed in a plane parallel to the plane of disc 37. In the present instance fan 30 includes eight blade members 38 each being backwardly inclined and curved slightly to maintain efficient gas flow in the fan. The casing of fan 30 is formed to include an inlet 40 having an inner diameter substantially equal to the inner diameter of annular element 39. Inlet 40 is connected to the open end of duct 10, and an annular joint 41 is provided to seal the connection. Fan drive shaft 32 is connected to drive means in the form of an electric motor 42 for rotating shaft 32 and fan wheel 34 at a relatively low speed the motor including suitable means 43 for maintaining the speed in a desired range. One form of fan means 30 found to perform satisfactorily in the method and apparatus of the present invention is an industrial exhauster commercially available from the Canadian Buffalo Forge Co. designated size 30 AW and described in Bulletin F1-112.

Fan 30 includes means in the form of an exhaust passage 44 formed in volute casing 36 for removing clean gas from fan 30. Exhaust passage 44 is at the upper portion of casing 36 as viewed in FIGS. 1 and 2 and is connected to one end of an output duct 46 for exhausting clean gas from the apparatus. The connection of passage 44 to duct 46 is sealed by a joint 47. Fan 30 further includes means in the form of an opening 48 provided in volute casing 36 at the lower end as viewed in FIGS. 1 and 2 for removing or collecting particulate matter separated from the gas stream. Opening 48 is in communication with a relatively short duct or passage 49, disposed generally vertically and having a gradually decreasing cross-section, which is sealed by a joint 50 to the top of a vertically disposed tube or conduit 52, the other end of which terminates in a sludge trap in the form of an open top container 54. During use, container 54 preferably includes water or similar liquid 56 up to a level above the bottom of tube 52.

The injection of liquid spray into the gas stream flowing in duct 10 should be at a minimum distance upstream from the intake of fan 30 at which the spray cone completely fills the duct. In some instances it may be desirable to have this distance greater. According to an illustrative mode of the present invention, spray nozzle 14 is located at a distance upstream from the intake of fan 30 a distance of five times the diameter of duct 10. Nozzle 14 is mounted in a manner such that the spray extends to the radius of duct 10 a distance two feet upstream from the inlet of fan 30. The distance between spray nozzle 14 and inlet 12 is not critical.

The method of the present invention is performed by operating the apparatus of FIG. 1 in the following manner. Air or other types of gas containing particulate matter, for example dust, is moved or drawn along duct 10 through inlet 12 in a direction indicated by arrow 60 in FIG. 1 by the operation of fan 30 the axis of rotation of fan 30 being generally coincident with the longitudinal axis of conduit 10. The mixture of gas and particulate matter passes through the relatively straight section of duct 10 which serves as a calming section after which it enters the spray zone provided by nozzle 14. In the spray zone, an atomized liquid droplet spray, preferably water, is injected concurrently with the dusty air stream. The wet, dusty air enters centrifugal fan 30 in the direction indicated by arrow 62 from which the collected particulate matter and water droplets exit into the sludge trap provided by opening 48 at the bottom of fan 30 as viewed in FIG. 1, and air, uncollected particles and entrained droplets exit through the fan exhaust opening 44. The flow of clean air continues through the exhaust ducting 46 in the direction of arrow 64 from which it can be discharged into the atmosphere.

Good dust removal efficiencies have been obtained with the method and apparatus of the present invention by operating fan 30 at a relatively low speed in the range from about 300 rpm to about 1000 r.p.m. and preferably at about 600 rpm and with a relatively fine spray or mist from nozzle 14, the water droplets having a size in the range from about 10 to about 30 microns. Under these conditions pressure losses are under about 1 inch of water. In addition to moving the gas stream through the apparatus, fan means 30 also serve as a contactor, supersaturator-condenser, and centrifugal separator as will be explained in further detail presently.

Figure 4:
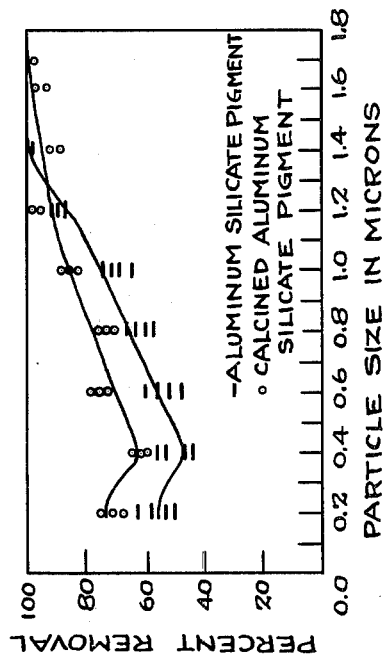
Figure 5:
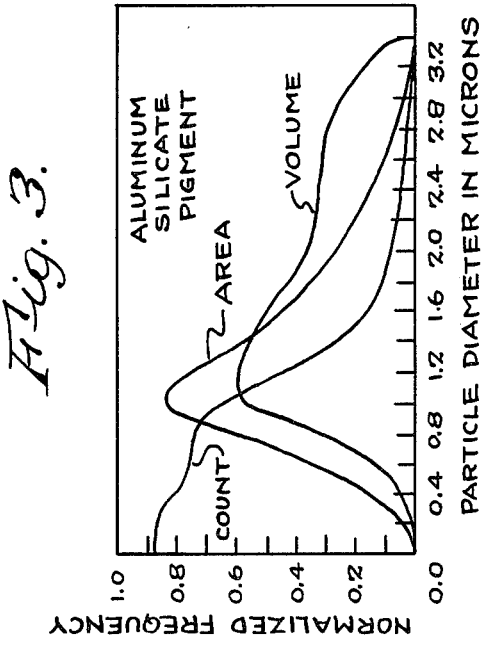

The method and apparatus of the present invention are illustrated further by way of the following examples derived from test results. Two of the sample dusts used in the tests, an aluminum silicate pigment and a calcined aluminum silicate pigment were selected as typical of the range of particle sizes found to be least readily collected by other scrubbing devices. The third sample dust used in the tests, a diatomacoeus earth of somewhat larger particle size, was selected to test the efficiency of the scrubber of the present invention with particles having a size above 1 micron in diameter. Dust samples were collected from both the intake and exhaust streams of the apparatus on the polished face of an aluminum stub. Scanning electron micrographs of the samples were used to determine number distributions by particle size with the aid of an image analyzing computer. In particular, sample stubs were prepared by polishing aluminum stubs to the "pre-lap" stage on a metallurgical sample preparation polishing wheel, using aluminum oxide powder as an abrasive. The sample stub then was placed in the airstream in the inlet or outlet duct orthogonal to the airflow for a period of about three seconds and those samples having as little agglomeration as possible were retained. The scanning electron microscope used was a Stereoscan Mark 2A produced by Cambridge Instruments Limited and capable of resolving the specimens from magnifications of 20 diameters to 100,000 diameters. A series of photomicrographs was prepared for each sample by selecting areas having a reasonable density of particles. Photographs of the oscilloscope display of the samples were obtained on Kodak panchromatic-X film through a Nikkromat FTN Camera attached through a hood to a display oscilloscope. The photomicrographs were then used to obtain a particle size distribution using an image analyzing computer known as a Quantimet or QTM. The use of the QTM as an aid to particle size distribution and analysis is described further by FAL Dullien and P. N. Metha in *Power Technology* Volume 5, Page 179, 1972. The count distribution obtained was converted to a surface distribution and to a volume distribution in accordance with a mathematical procedure described by C. E. Lapple in *Chemical Engineering,* May 20, 1968 on Page 149. Particle size distributions are presented on a normalized frequency distribution basis for aluminum silicate pigment in FIG. 2, for calcined aluminum silicate in FIG. 3, and for diatomaceous earth in FIG. 4.

For the tests, the apparatus of FIG. 1 was provided with a dispersing venturi (not shown) with the outlet of the venturi connected to inlet 12. Ambient air enters the system directly through the inlet of the venturi with no preliminary conditioning. Test dust was manually injected into the throat of the venturi through an orifice therein where the air stream is at its highest velocity. The rate of injection can be controlled by varying the size of the orifice through which dust is injected. The dust is mixed with the incoming air stream through the static pressure regaining section of the venturi. Values of fan speed, inlet air temperature, barometric pressure, inlet relative humidity, spray zone relative humidity, water injection rate and static pressure were measured directly. A wet and dry bulb thermometer system (not shown) was inserted at a point six inches downstream from the dispersing venturi to a depth of 3 inches in duct 10. Another wet and dry bulb thermometer is inserted a distance 1½ feet upstream from the inlet to fan 30. Standard U-tube manometers are used to obtain static pressure differentials at locations along duct 10 adjacent the locations where the wet and dry bulb thermometer are inserted and also adjacent the spray zone including nozzle 14. The manometer also is inserted at a point in exhaust duct 46 downstream from fan 30. Inlet dust loadings were calculated from a knowledge of the flow rate of the air stream on the weight of a sample of dust injected into the system in a known time period. Flowing volumes of air were determined by calculation from point velocities obtained by pitot traverse. In particular, access ports are provided in both the inlet and exhaust ducting to allow full pitot tube traverses for the determination of velocity profiles. Two access ports each 0.437 inches in diameter are located 24 inches upstream in duct 10 from the inlet of fan 30 and two access ports having a diameter of 0.75 inch are located 18 feet 8 inches along exhaust duct 50 from fan 30 in accordance with ASME power test code no. 21. Velocity is calculated from the differential pressure using a form of Bernoulli's equation for use at ambient temperatures in ducting where the static pressure is different from atmospheric. Then the volumetric flow rate is obtained from the average velocity and the known cross-sectional area of the duct. Outlet dust loadings are calculated in grains per cubic foot from knowledge of the weight of dust obtained in a known volume of sample pulled through the sampling system. The sampling system comprised a probe inserted into duct 46 at the same distance where the pitot tube was located, an in-line disk filter, four bubble columns, a dry gas meter, and a vacuum pump. Values calculated from the measured variables include air velocity at duct conditions, air flowing volume at duct conditions and saturation levels. Saturation level is the ratio of the weight of water supplied to the weight of water required to saturate the incoming air. Values for water content level were obtained from psychrometric charts.

Mass efficiency is the overall efficiency of the scrubber based on the mass of dust removed from the system. It can be expressed by using any two of the three quantities which enter into a material balance for the dust $A = B + C$, where $A$ represents the weight of dust fed into the system, $B$ the weight collected as sludge and, $C$ residual uncollected dust resulting in the following three ways of expressing scrubber efficiencies: $B/A$; $(A-C)/A$; and $B/(B+C)$.

The normal operating procedure for each test run was as follows. The sludge trap comprising container 54 was filled with water 56 to a level sufficient to insure an air seal of conduit 52, and a dust charge was prepared by drying the dust and weighing a charge large enough to provide the required dust flow over an adequate length of time. If the apparatus is connected to the exhaust system of a building, the building fan should be in operation to insure no leakage of dusty exhaust air into the building fume hood exhaust system. With the ducting open, fan 30 is started and compressed air is supplied to nozzle 14. The conditions are recorded, velocity traverses completed and static pressure drops recorded. Then water is introduced through spray nozzle 14, the water volume and air and water pressures are recorded, and static pressure drops in the system are recorded. Manual injection of the dust then is begun and sampling of the exhaust particulate loading is started and completed. After that, dust injection is stopped, dust remaining in the injection system is weighed, and spray injection is stopped. Velocity traverses are performed and static pressure drops are recorded. Fan 30 then is shut off and the particulate build-up on the inlet side of fan 30 in the spray zone is washed into sludge trap 54. Overhead particulate sample is recovered, dried and weighed, and on completion of the run the sludge in sludge trap 54 is recovered, dried and weighed.

In all runs water spray was operated for a period of five minutes before dust injection began. All runs, both qualitative and quantative, were performed at dust loadings in the range frequently encountered in industrial situations, i.e. between 1.0 and 5.0 grains per cubic foot of dry gas. The efficiency and operation at a fan speed of 1500 rpm was observed to be very poor, and at 1000 rpm there was some improvement but not sufficient to warrant further investigation. The nominal fan speed of 600 rpm, which gave an actual value of 614 rpm by the Strobotac method, resulted in the least droplet entrainment in the exhaust duct 46 as well as the highest efficiency figures. The results of the tests for the three test dust samples, aluminum silicate pigment, calcined aluminum silicate and natural grade Celite (diatomaceous earth) are presented in tables I-III.

TABLE I

Scrubber Efficiency - Aluminium Silicate Pigment

| Run | 1 | 2 | 3 | 4 |
|---|---|---|---|---|
| Fan speed, rpm | 614 | 614 | 614 | 614 |
| Temperature, °F | 75.0 | 72.0 | 70.0 | 71.0 |
| Barometric Pressure mm Hg | 731.4 | 737.9 | 749.3 | 734.5 |
| Inlet Relative Humidity % | 48.0 | 25.0 | 20.0 | 46.0 |
| Spray Zone Relative Humidity % | 100.0 | 100.0 | 100.0 | 100.0 |
| Air Velocity, ft/sec | 15.0 | 15.73 | 17.49 | 16.44 |
| Air Volume, ft³/min (at flowing conditions) | 745.0 | 786.0 | 876.0 | 821.0 |
| Inlet Dust Loading, grains/ft³ | 1.395 | 1.55 | 2.189 | 1.77 |
| Outlet Dust Loading, grains/ft³ | .1925 | .165 | .226 | .320 |
| Water Rate, lb/min | 2.06 | 1.99 | 2.11 | 2.11 |
| Saturation Level | 17.7 | 8.43 | 11.2 | 17.4 |
| Static Pressure Drop inches, H₂O | 0.96 | 0.96 | 0.95 | 0.96 |
| Efficiency, B/A, % | — | 68.5 | 71.6 | 71.0 |
| Efficiency, (A−C)/A, % | 86.0 | 82.2 | 83.3 | 81.8 |
| Efficiency, B/B+C, % | — | 79.4 | 82.4 | 79.5 |

TABLE 2

Scrubber Efficiency - Calcined Aluminium Silicate

| Run | 1 | 2 | 3 | 4 |
|---|---|---|---|---|
| Fan Speed, rpm | 614 | 614 | 614 | 614 |
| Temperature °F | 70.0 | 70.0 | 68.0 | 73.0 |
| Barometric Pressure, mm Hg | 733.4 | 737.1 | 732.4 | 727.9 |
| Inlet Relative Humidity, % | 18.0 | 16.0 | 23.0 | 30.0 |
| Spray Zone Relative Humidity, % | 100.0 | 100.0 | 100.0 | 100.0 |
| Air Velocity, ft/sec | 16.24 | 15.20 | 15.41 | 15.40 |
| Air Volume, ft³/min (at flowing conditions) | 811.87 | 760.31 | 770.64 | 769.95 |
| Inlet Dust Loading, grains/ft³ | 2.22 | 1.865 | 1.855 | 1.650 |
| Outlet Dust Loading, grains/ft³ | .221 | .207 | .223 | .189 |
| Water Rate, lb/min | 2.09 | 2.03 | 2.09 | 1.90 |
| Saturation Level | 8.43 | 7.77 | 8.90 | 8.38 |
| Static Pressure Drop inches H₂O | 0.93 | 0.94 | 0.94 | 0.90 |
| Efficiency, B/A, % | 78.0 | 73.0 | 73.0 | 76.3 |
| Efficiency, (A−C)/A, % | 90.0 | 89.0 | 90.3 | 88.5 |
| Efficiency, B/B±C, % | 89.5 | 87.0 | 88.4 | 86.8 |

TABLE 3

Scrubber Efficiency - Natural Grade Celite

| Run | 1 | 2 | 3 | 4 |
|---|---|---|---|---|
| Fan Speed, rpm | 614 | 614 | 614 | 614 |
| Temperature, °F | 73.0 | 65.0 | 66.0 | 68.0 |
| Barometric Pressure, mm Hg | 730.7 | 735.2 | 729.1 | 738.5 |
| Inlet Relative Humidity, % | 20.0 | 29.0 | 36.0 | 24.0 |
| Spray Zone Relative Humidity, % | 100.0 | 100.0 | 100.0 | 100.0 |
| Air Velocity, ft/sec | 15.13 | 15.04 | 15.82 | 15.42 |
| Air Volume, ft³/min (at flowing conditions) | 756.66 | 751.98 | 791.19 | 770.93 |
| Inlet Dust Loading | | | | |

TABLE 3-continued

| Scrubber Efficiency - Natural Grade Celite | | | | |
|---|---|---|---|---|
| Run | 1 | 2 | 3 | 4 |
| grains/ft³ | 6.65 | 3.30 | 2.48 | 2.46 |
| Outlet Dust Loading | | | | |
| grains/ft³ | .241 | .137 | .121 | .128 |
| Water Rate, lb/min | 2.03 | 2.03 | 2.16 | 2.16 |
| Saturation Level | 7.35 | 8.70 | 12.10 | 8.60 |
| Static Pressure Drop | | | | |
| inches H₂O | 0.91 | 0.91 | 0.94 | 0.94 |
| Efficiency, B/A, % | 97.8 | 85.4 | 92.5 | 89.6 |
| Efficiency, (A−C)/A, % | 96.4 | 95.8 | 95.1 | 94.8 |
| Efficiency, B/B+C, % | 96.4 | 95.4 | 94.8 | 95.0 |

Several conclusions can be drawn from analysis of the data contained in tables 1–3. As a general observation, the method and apparatus of the present invention is shown to be efficient in the removal of small particles from air streams. In the worst case, the efficiency was 69 percent using the poorest estimate of efficiency, i.e. that employing the recovered sludge as a basis for calculation. At best, the efficiency was 97 percent on all bases of calculating the efficiency. From the nature of the three sample dusts used in these tests, the method apparatus has acceptable efficiencies for dusts in the particle size range of 0.1 to about 10 microns.

The fact that the method and apparatus was found to be most effective at the lowest available fan speed may suggest that the contact time between the blades of fan 30 and the gas, particulate matter, and liquid droplets plays an important role in determining efficiency. Effectiveness at low fan speed has the significant advantage of low power consumption by the method and apparatus.

Figure 6:
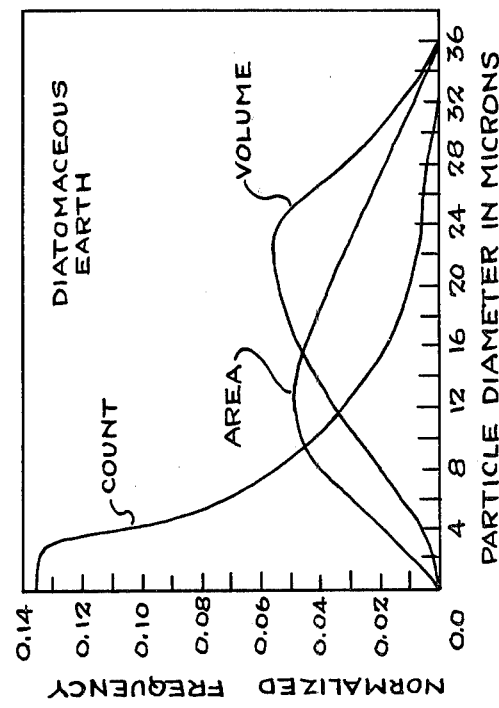
FIG. 6 is a graph or plot of fractional efficiency as a function of particle size for two tests conducted on the method and apparatus of the present invention.

From a knowledge of the mass efficiency of the method and apparatus for each run during the test, and from the inlet and outlet particle size distributions based on mass, it is theoretically possible to calculate the system efficiency for narrow fractions of particle sizes. The results of these calculations are shown in FIG. 6 for both the aluminum silicate pigment and calcined aluminum silicate pigment samples. Both samples show a drop in fractional efficiency in the particle size range 0.3 microns to 0.6 microns, passing through a minimum recovery in the 0.4 micron range. This recovery value is probably explainable as a result of the presence of particles which are too large to be subject to diffusive collection and too small to be subject to collection by intertial impaction or interception.

The intense fog or mist entering fan 30 apparently is precipitated by the fan since no fog was observed leaving fan 30 and no trace of moisture was detected on the walls of the vertical section of exhaust ducting 46. Before the centrifugal force generated by the low speed (600 rpm) fan wheel 34 could precipitate the mixed droplets of 10-micron size, however, these droplets would have to undergo a very substantial increase in mass. The several percent compression achieved by fan 30 can be expected to result in a sufficient degree of supersaturation with respect to water vapor to cause some condensation of water on the nuclei present inside the fan casing 36. The conditions may also be favorable for rapid growth of larger droplets at the expense of smaller ones, either by direct collision between droplets, or by an evaporation-condensation mechanism or by both mechanisms together.

The presence of mist has been found necessary to obtain efficient removal of dust by fan 30. It is quite likely, therefore, that the processes leading to the precipitation of the mist also played a role in the removal of most of the dust from the air stream. The highly turbulent conditions existing inside the casing of fan 30 are believed to increase the probability for collision between the dust particles and water droplets which may lead to the capture of the particles. Condensation of water vapor on the droplets may also result in capture of dust by diffusiophoresis. In particular, the very fine spray added to the air stream ensures that the latter becomes saturated with water vapor before entering the fan intake. In other words, part of the spray evaporates before entering the fan. Since the spray contains a range of droplet sizes, the smaller droplets will tend to evaporate and the large ones tend to grow, while absorbing dust particles. The water vapor diffusing from the small droplets to the larger ones gives rise to a wind-like effect that sweeps the dust particles in its path to the surface of the larger droplets where they are absorbed. This phenomena is known as diffusiophoresis. Water vapor also adsorbs on the surface of the dust particles, and the particles can be expected to agglomerate more readily on impact under conditions of 100% humidity than under dry conditions. The dust particles may also serve as nuclei for condensation of water vapor. The process of droplet growth by condensation mechanism starts as soon as the spray has been formed and it proceeds at a much faster rate in the fan casing 36 owing chiefly to the rise in pressure and to the turbulent conditions. Operating fan 30 at a relativeky low speed, i.e. about 600 rpm, favors the condensation process. It would appear that operating fan 30 at relatively high speeds, i.e. about 1000 rpm or more, does not favor the condensation process presumably because of the effect of excessive centrifugal force and insufficient residence time in the fan casing 36.

The decreasing efficiency of removal of smaller particles may be explained, at least in part, in terms of the relatively great numbers of small particles compared to those of the larger ones. Were the probability of capturing a particle independent of the size of the particle this alone would result in a lower percent removal of the more numerous smaller particles. In addition, however, it is quite likely that the probability of capturing a particle tends to increase with increasing particle size at least down to 0.2–0.4 micron size, where the importance of diffusiophoresis starts becoming predominant. In other tests conducted on a dioctyl phthalate aerosol of 0.3 micron particle size, a 53% removal was obtained. This point lies midway between the fractional efficiency curves of FIG. 6 and would indicate that the scrubber works effectively on any type of particle, solid or liquid.

The method and apparatus of the present invention thus provides an efficient and effective removal of particulate matter, particularly relatively fine particles, from a gas stream with relatively small energy requirements and pressure drop across the apparatus. Good dust removal efficiencies are obtained by feeding a mixture of airborne dust and fine mist into a fan operating at the relatively low speed of about 600 rpm. In particular, the efficiency of the scrubber, using very fine spray, improves drastically when the fan speed is decreased from 1500 rpm through 1000 rpm to about 600 rpm. These favorable results were obtained with system pressure losses under one inch of water. The very fine mist, i.e. a droplet size ranging from about 10 to about 30 microns, is quantitatively precipitated by the low speed fan, but if the scrubber is operated without a liquid spray or with a coarse spray, the efficiency is significantly reduced and approaches zero in some instances. The method and apparatus of the present invention is particularly effective in removing fine particles such as aerosols and fine mists.

It is therefore apparent that the present invention accomplishes its intended objects. While a single embodiment of the present invention has been described in detail, this is done for the purpose of illustration, not limitation.

We claim:

1. Apparatus for separating particulate matter from a gas stream comprising:
   a. conduit means having a dirty gas inlet at one end thereof;
   b. fan means having an inlet in communication with said conduit means adjacent the other end of said conduit means, said fan means including drive means for operating said fan means at a relatively low speed, means defining an exhaust passage for clean gas separated by said fan means and means for collecting particulate matter separated from the gas stream by said fan means, said fan drive means including means operative to maintain the speed of operation of said fan means in a low speed range sufficient to move the gas along said conduit means into said fan means up to about 1000 r.p.m.;
   c. means for discharging a liquid into said gas stream prior to separation of the particulate matter from the gas by said fan means, said liquid discharging means comprising nozzle means including means for producing a relatively fine liquid spray of droplets wherein the droplets range in size from about 10 microns to about 30 microns, said liquid discharging means being operative to cause said fine liquid spray to capture the particulate matter and the spray droplets to agglomerate to form relatively larger drops of liquid which absorb the particulate matter and some of said liquid spray droplets evaporate to form vapor in said conduit means, and
   d. said speed maintaining means establishing a fan means speed sufficient to favor condensation in said fan means of said vapor on said particulate matter thereby forming additional particle-containing liquid droplets, and sufficient to precipitate said relatively larger drops of liquid which absorb the particulate matter and said additional condensed particle-containing liquid droplets in said fan means.

2. Apparatus according to claim 1, wherein said fan means is of the centrifugal type having a bladed fan wheel rotatably mounted in a volute casing and having a clean gas exhaust opening adjacent the upper portion of said casing and an opening for removing particulate matter adjacent the lower portion of said casing.

3. Apparatus according to claim 1, further including means for supplying gas under pressure to said nozzle means and wherein said nozzle means includes means for mixing said liquid and said gas to produce said relatively fine spray wherein the liquid droplets range in size from about 10 microns to about 30 microns.

4. Apparatus according to claim 1, wherein said nozzle means is located at a distance upstream from said fan means sufficient to enable the spray to fill said conduit means.

5. Apparatus according to claim 1, wherein said liquid discharging means comprises a source of water and nozzle means positioned in said conduit means and connected to said source of water, said nozzle means including means for producing a relatively fine spray wherein the water droplets range in size from about 10 microns to about 30 microns.

6. Apparatus according to claim 5, wherein said nozzle means is located at a distance upstream from said fan means sufficient to allow the spray to fill the conduit means.

7. Apparatus according to claim 1, wherein said conduit means is relatively straight and the axis of rotation of said fan means is generally coincident with the axis of said conduit means and wherein said liquid discharging means comprises spray nozzle means positioned between said dirty gas inlet and said fan means.

8. A method of separating particulate matter from a gas stream comprising:
   a. moving dirty gas along a duct and into a fan operating at a relatively low speed in a low speed range sufficient to move the gas along the duct into the fan up to about 1000 r.p.m.;
   b. discharging a relatively fine liquid spray of droplets wherein the liquid droplets range in size from about 10 to about 30 microns into the dirty gas in a manner causing said fine liquid spray of droplets to capture the particulate matter and the spray droplets to agglomerate to form relatively larger drops of liquid which absorb the particulate matter and some of said liquid droplets evaporate to form vapor in said duct the speed of said fan being sufficient to favor condensation in said fan of said vapor on said particulate matter therby forming additional particle-containing liquid droplets, and sufficient to precipitate said relatively larger drops of liquid which absorb the particulate matter and said additional condensed particle-containing liquid droplets in said fan; and
   c. withdrawing clean gas separated from the particulate matter by said fan.

9. A method according to claim 8, wherein said fan is operated at a speed of about 600 rpm.

10. A method according to claim 8, wherein said liquid comprises water.

11. A method according to claim 8, further including collecting particulate matter separated from the gas stream by said fan.

* * * * *